United States Patent
Ulrey et al.

(10) Patent No.: US 9,657,664 B2
(45) Date of Patent: May 23, 2017

(54) METHOD AND SYSTEM FOR MAINTAINING A DFSO

(71) Applicant: Ford Global Technologies, LLC, Dearborn, MI (US)

(72) Inventors: Joseph Norman Ulrey, Dearborn, MI (US); Michiel J. Van Nieuwstadt, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 303 days.

(21) Appl. No.: 14/611,385

(22) Filed: Feb. 2, 2015

(65) Prior Publication Data

US 2016/0222898 A1    Aug. 4, 2016

(51) Int. Cl.
| | | |
|---|---|---|
| *F01N 3/00* | (2006.01) | |
| *F02D 41/00* | (2006.01) | |
| *F01N 3/021* | (2006.01) | |
| *F02D 41/02* | (2006.01) | |
| *F02D 41/12* | (2006.01) | |
| *F02D 41/14* | (2006.01) | |
| *F01N 9/00* | (2006.01) | |
| *F02D 41/06* | (2006.01) | |

(52) U.S. Cl.
CPC ......... *F02D 41/0087* (2013.01); *F01N 3/021* (2013.01); *F01N 9/002* (2013.01); *F02D 41/029* (2013.01); *F02D 41/12* (2013.01); *F02D 41/1445* (2013.01); *F02D 41/1448* (2013.01); *F02D 41/1456* (2013.01); *F01N 2430/02* (2013.01); *F01N 2430/06* (2013.01); *F01N 2900/1602* (2013.01); *F01N 2900/1606* (2013.01); *F02D 41/064* (2013.01); *F02D 41/123* (2013.01); *F02D 2200/0802* (2013.01); *F02D 2200/0812* (2013.01); *F02D 2200/701* (2013.01)

(58) Field of Classification Search
CPC ...... F02D 41/12; F02D 41/123; F02D 41/126; F02D 41/0087; F02D 41/0265; F02D 41/025; F02D 2041/0265; F02D 2041/027; F02D 2041/029; F02D 2041/0295

See application file for complete search history.

(56) References Cited

U.S. PATENT DOCUMENTS

| | | | |
|---|---|---|---|
| 6,269,793 B1 | 8/2001 | Russ et al. | |
| 6,681,563 B2 * | 1/2004 | Glugla | F01N 3/101 123/198 F |
| 7,694,509 B2 * | 4/2010 | Noirot | F01N 3/023 60/274 |
| 8,347,612 B2 | 1/2013 | Tewari et al. | |

(Continued)

FOREIGN PATENT DOCUMENTS

WO    2014090497 A1    6/2014

OTHER PUBLICATIONS

Boger, T. et al., "Regeneration Strategies for an Enhanced Thermal Management of Oxide Diesel Particulate Filters," SAE Technical Paper Series No. 2008-01-0328, 2008 World Congress, Detroit, MI., Apr. 14-17, 2008, 13 pages.

*Primary Examiner* — Thomas Moulis
(74) *Attorney, Agent, or Firm* — Julia Voutyras; McCoy Russell LLP (57) ABSTRACT

Methods and systems are provided for controlling a length of DFSO. In one example, a method may include adjusting the length of DFSO based on a particulate filter temperature change.

20 Claims, 6 Drawing Sheets

(56) References Cited

U.S. PATENT DOCUMENTS

| | | | |
|---|---|---|---|
| 8,607,544 B2* | 12/2013 | Uhrich | F01N 3/0842 123/198 F |
| 9,394,837 B2* | 7/2016 | Ulrey | F02D 41/0087 |
| 2002/0115532 A1* | 8/2002 | Wakashiro | B60K 6/48 477/111 |
| 2004/0020194 A1* | 2/2004 | Nishimura | F01N 3/023 60/297 |
| 2004/0123589 A1* | 7/2004 | Ohtake | F02D 41/029 60/295 |
| 2008/0196395 A1* | 8/2008 | Hashizume | F01N 3/023 60/295 |
| 2011/0000190 A1 | 1/2011 | Svensson et al. | |
| 2011/0072784 A1* | 3/2011 | Hepburn | F01N 3/101 60/274 |
| 2011/0120090 A1 | 5/2011 | Sorensen, Jr. | |
| 2011/0126520 A1* | 6/2011 | Kim | F02D 41/0055 60/278 |
| 2012/0291760 A1* | 11/2012 | Vigild | F02M 31/13 123/542 |
| 2013/0061573 A1* | 3/2013 | In | F01N 3/023 60/274 |
| 2014/0080668 A1 | 3/2014 | Doering et al. | |
| 2016/0201532 A1* | 7/2016 | Chanko | F01N 3/0232 60/274 |

\* cited by examiner

METHOD AND SYSTEM FOR MAINTAINING A DFSO

FIELD

The present description relates generally to methods and systems for controlling a vehicle engine to perform a particulate filter regeneration during deceleration fuel shut-off (DFSO).

BACKGROUND/SUMMARY

Emission after-treatment devices may be used to treat exhaust gas of internal combustion engines. In particular, emission treatment devices may include particulate filters, oxidation catalysts, and nitrogen oxide (NOx) catalysts. Particulate matter, which is largely made up of carbon particles from incomplete combustion, may be collected in particulate filters and may gradually restrict a flow of an exhaust gas as the particulate matter accumulates in the particulate filters. In order to periodically regenerate or purge the filter of particulate matter, measures may be taken that result in an increase of the exhaust gas temperature above a predetermined level (e.g. above 450° C.) in order to incinerate the carbon particles accumulated in the filter.

In some cases, a particulate filter reaches high enough exhaust temperatures during normal vehicle operation to passively perform a particulate filter regeneration. However, some vehicles may not reach passive regeneration conditions (e.g., vehicle speeds above 40 mph) and the particulate filter may become fouled. A regeneration of the particulate filter may additionally or alternatively occur during deceleration fuel shut off operating conditions (DFSO). DFSO is a mode to increase fuel economy and reduce brake wear in motor vehicles with a powertrain that normally operates at stoichiometry. In this approach, fuel injection to one or more cylinders is disabled during select operating conditions.

In some cases, a vehicle may perform a particulate filter regeneration during DFSO based on an estimated soot load and particulate matter reaction rate. An estimated soot load may be based on an exhaust backpressure measured upstream of the particulate filter. A particulate matter reaction rate may be calculated based on the estimated soot load. However, the inventors have found issues with the above identified operation. For instance, a soot load on a particulate filter may be difficult to estimate due to an accumulating ash load. The ash load may artificially increase the estimated soot load by increasing the exhaust backpressure, where the increase is mistaken for an increase in soot, resulting in an increased estimate of the particulate matter reaction rate and unnecessary reduction of the length of DFSO. Therefore, a DFSO particulate filter regeneration may be unnecessarily limited to protect the particulate filter against the combustion of a soot load that is not there. High particulate filter temperatures may cause particulate filter degradation which may include but is not limited to the particulate filter developing a leak or completely burning up (e.g., missing particulate filter).

However, the inventors have found various approaches to circumvent the issues listed above. In one example, the issues described above may be addressed by a method for adjusting a length of a deceleration fuel shut-off (DFSO) event and a total number of activated and deactivated cylinders during the DFSO based on a particulate filter temperature change during a particulate filter regeneration. Further, the length may be adjusted based on an assumed maximum soot load on the particulate filter. By assuming a maximum soot load on the particulate filter, a particulate matter reaction rate (e.g., rate at which soot is burned off the particulate filter) is dependent on oxygen availability. As one example, if a particulate matter reaction length is greater than the length of DFSO, then one or more cylinders of an engine may be activated during DFSO to reduce an oxygen flow and extend a length of DFSO to match the reaction rate of soot. In this way, the oxygen flow rate is decreased while still performing a particulate filter regeneration during DFSO. By doing this, the filter may not exceed a maximum allowed particulate filter temperature, therefore reducing the likelihood of a particulate filter degradation, while completing the particulate filter regeneration.

The above discussion includes recognitions made by the inventors and not admitted to be generally known. Thus, it should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for controlling a length of DFSO particulate filter regeneration. A particulate filter may be placed in an exhaust pathway of an engine, wherein the particulate filter may capture soot (e.g., particulate matter) from an exhaust gas.

Drivers who do not expose their vehicles to passive particulate filter regeneration conditions (e.g., vehicle travel less than a threshold vehicle travel) may have a fouled particulate filter, which can increase an exhaust backpressure and prevent exhaust gas from being exhausted from an engine properly. Particulate filter regeneration assist conditions promote an increase in an exhaust temperature flowing to the particulate filter to facilitate regeneration (e.g., increased amount of oxygen and fuel, spark retard, etc.). The fouled particulate filter may restrict an exhaust flow through the particulate filter and create an increased exhaust backpressure. A mode to enable increased oxygen flow, even during low load, may allow a particulate filter regeneration to occur. A decelerated fuel shut-off (DFSO) disables a fuel injection to one or more cylinders of an engine while still allowing air flow, thereby increasing an oxygen concentration of an exhaust gas flowing to the particulate filter. The increased oxygen concentration in the exhaust gas may promote a particulate filter regeneration for a particulate filter at a suitable regeneration temperature (e.g., 450° C. or above). Further, fuel may be injected into one or more cylinders during DFSO in order to decrease the oxygen concentration of the exhaust gas flowing to the particulate filters (e.g., firing one or more cylinders at stoichiometry). Still further, the firing cylinders may be operated at a variable air/fuel ratio (e.g., lambda greater than, less than, or equal to 1). By combusting the air mixture, oxygen is consumed and the relative percent oxygen of the exhaust gas is significantly decreased, ultimately decreasing a rate of increase for the particulate filter temperature.

Figure 4:
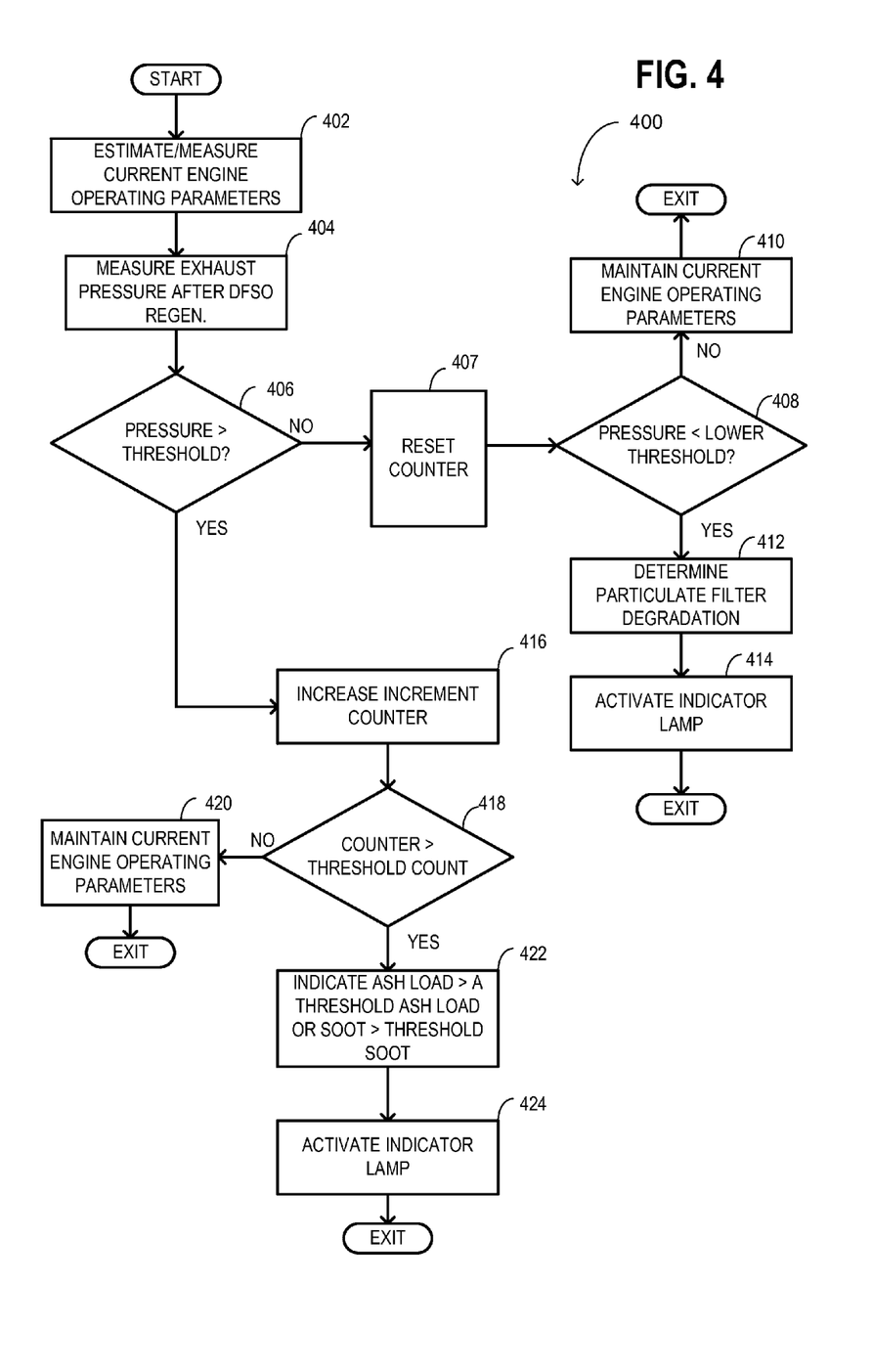
FIG. 4 shows a flow chart illustrating an example method for diagnosing an engine.
Figure 5:
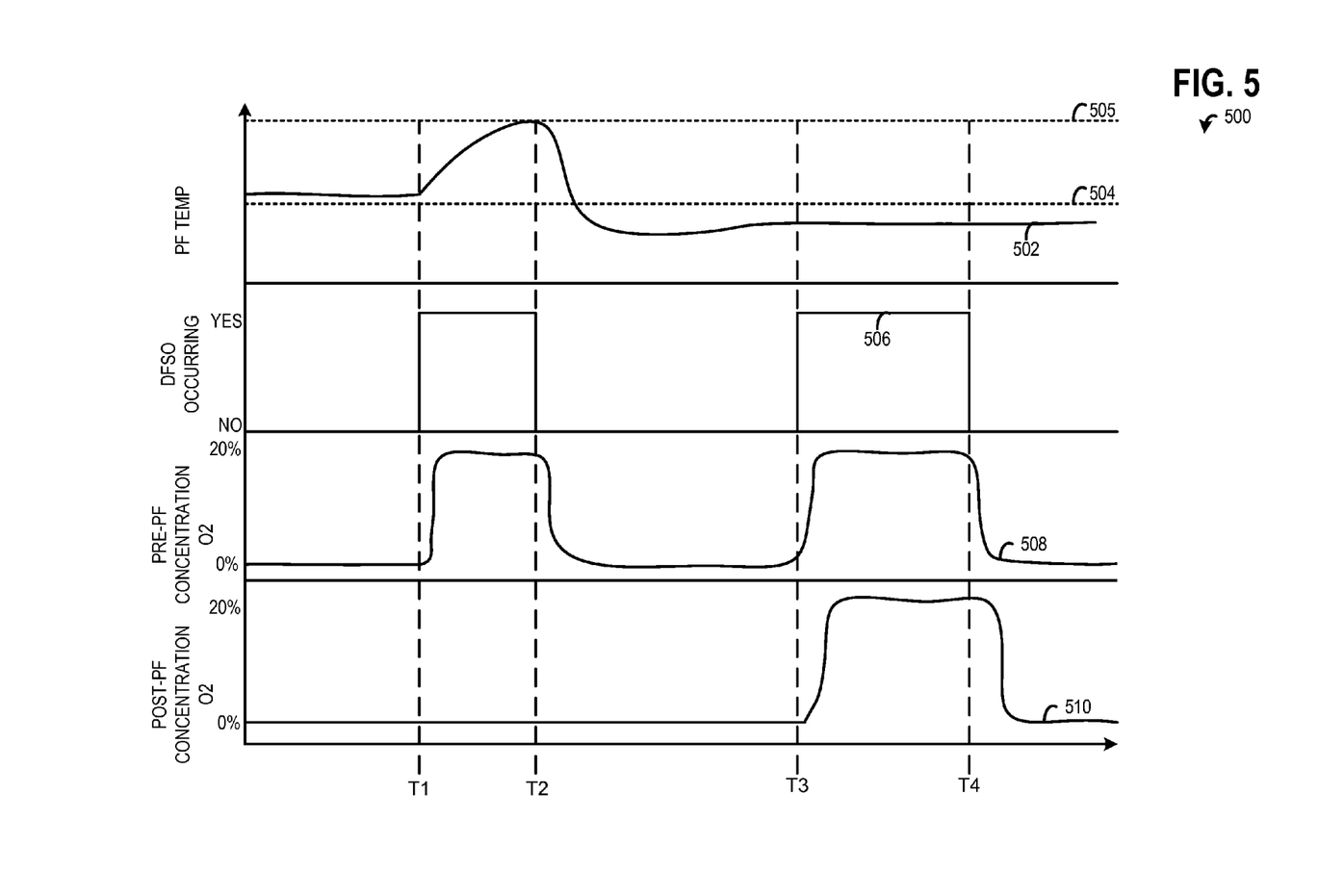
FIG. 5 shows a graph illustrating a length of DFSO based on a calculated oxygen concentration.
Figure 6:
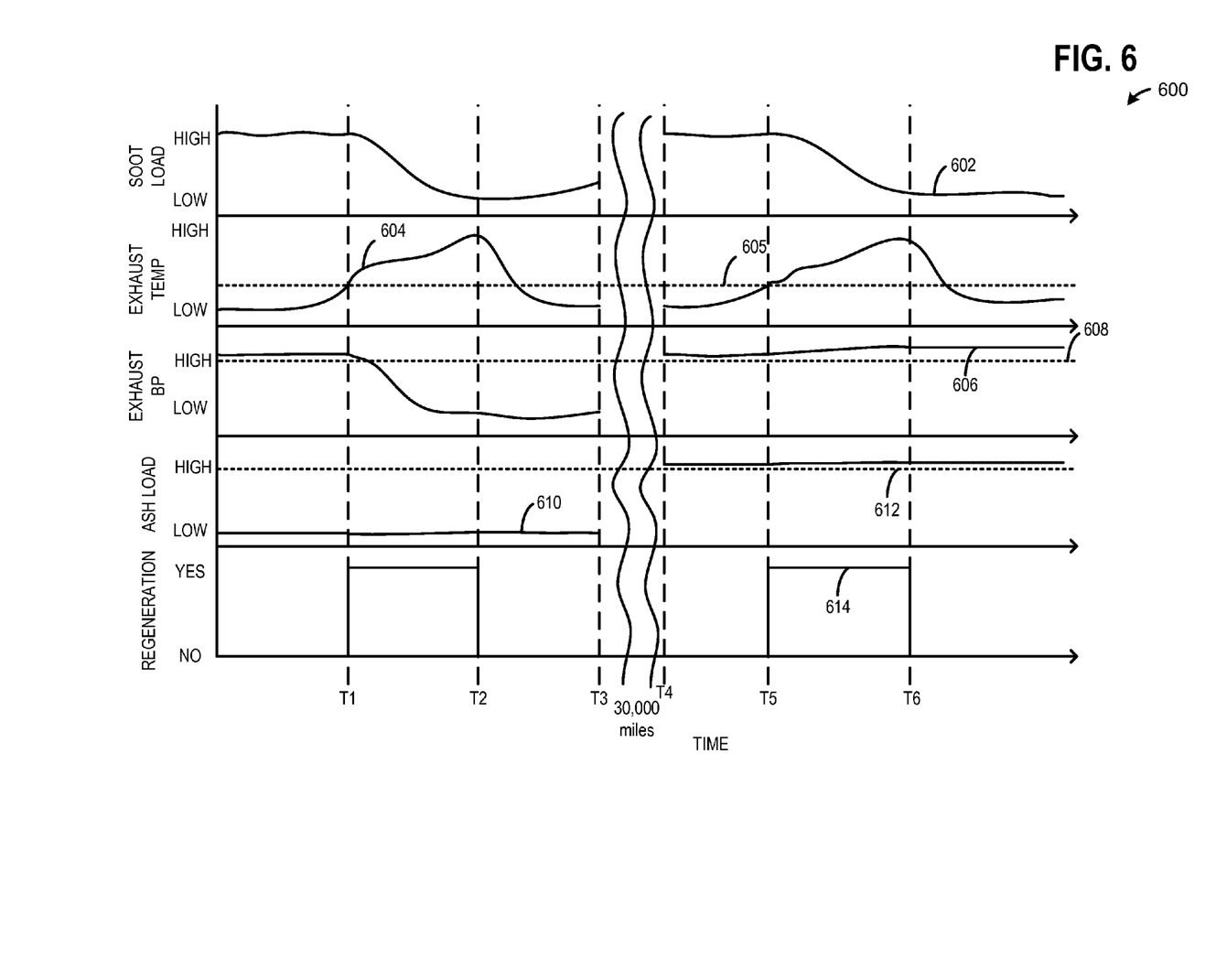
FIG. 6 shows a graph illustrating iterative regeneration events and monitoring of an exhaust pressure to diagnose an engine.

However, if the total concentration of oxygen exceeds a threshold concentration of oxygen, then the particulate filter temperature may surpass an upper threshold particulate filter temperature and the filter may become degraded. A method for determining DFSO conditions is described with respect to FIG. 2. A method for determining the threshold oxygen concentration along with determining a length of DFSO is described in FIG. 3. The method with respect to FIG. 3 may be based on determining a length of DFSO based on an estimated maximum soot load, but independent of a current estimated soot load. A diagnostic method for determining proper regeneration of the particulate filter is described with respect to FIG. 4. FIGS. 5 and 6 respectively illustrate the effect of oxygen concentration on DFSO length and determining proper diagnosis of an exhaust backpressure after particulate filter regenerations.

Figure 1:
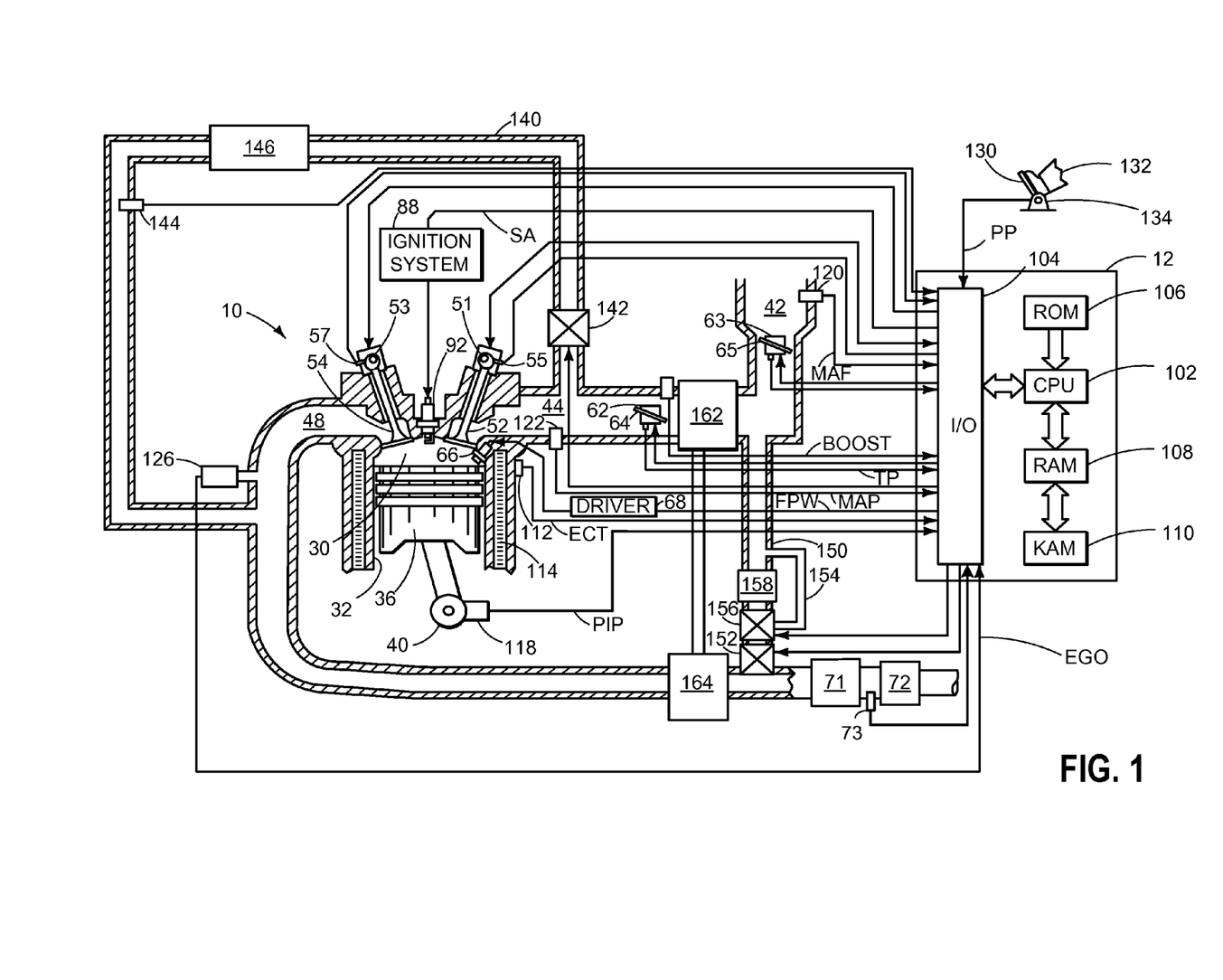
FIG. 1 shows a schematic diagram of an engine with a particulate filter.

Referring now to FIG. 1, a schematic diagram of one cylinder of an engine having a plurality of cylinders 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via high-pressure EGR (HP-EGR) passage 140 and/or low-pressure EGR (LP-EGR) passage 150. The amount of EGR provided to intake passage 44 may be varied by controller 12 via HP-EGR valve 142 or LP-EGR valve 152. In some embodiments, a throttle may be included in the exhaust to assist in driving the EGR. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust oxygen sensor and/or an intake oxygen sensor (intake manifold). Under some conditions, the EGR system may be used to regulate the temperature of the air and fuel mixture within the combustion chamber. FIG. 1 shows a high-pressure EGR system where EGR is routed from upstream of a turbine of a turbocharger to downstream of a compressor of a turbocharger and a low-pressure EGR system where EGR is routed from downstream of a turbine of a turbocharger to upstream of a compressor of the turbocharger. Further, as shown in FIG. 1, the HP-EGR system may include HP-EGR cooler 146 and the LP-EGR system may include LP-EGR cooler 158 to reject heat from the EGR gasses to engine coolant, for example. LP-EGR cooler bypass 154 and LP-EGR cooler bypass valve 156 may control the flow of EGR to the LP-EGR cooler 158. EGR flow to the EGR cooler may be decreased responsive to a condensate level in the LP-EGR cooler being greater than a threshold. In alternative embodiments, engine 10 may include only an HP-EGR system or only an LP-EGR system.

As such, engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_x$ trap, various other emission control devices, or combinations thereof. For example, device 71 may be a TWC and device 72 may be a particulate filter (PF). A pressure sensor 73 may be positioned upstream of PF 72. The pressure sensor may be used to measure an exhaust backpressure to determine PF degradation. In some embodiments, PF 72 may be located downstream of TWC 71 (as shown in FIG. 1), while in other embodiments, PF 72 may be positioned upstream of TWC 71 (not shown in FIG. 1). Further, in some embodiments, during operation of engine 10, emission control devices 71 and 72 may be periodically regenerated by operating at least one cylinder of the engine within a particular air/fuel ratio. Additionally or alternatively, a four-way catalyst may be used and the TWC 71 and the PF 72 may be removed.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor, and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses each revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc. A method for determining initiation of DFSO in a vehicle will be described below along with operating a PF regeneration during DFSO, and terminating DFSO responsive to a total oxygen concentration and/or a DFSO condition not being met.

Figure 2:
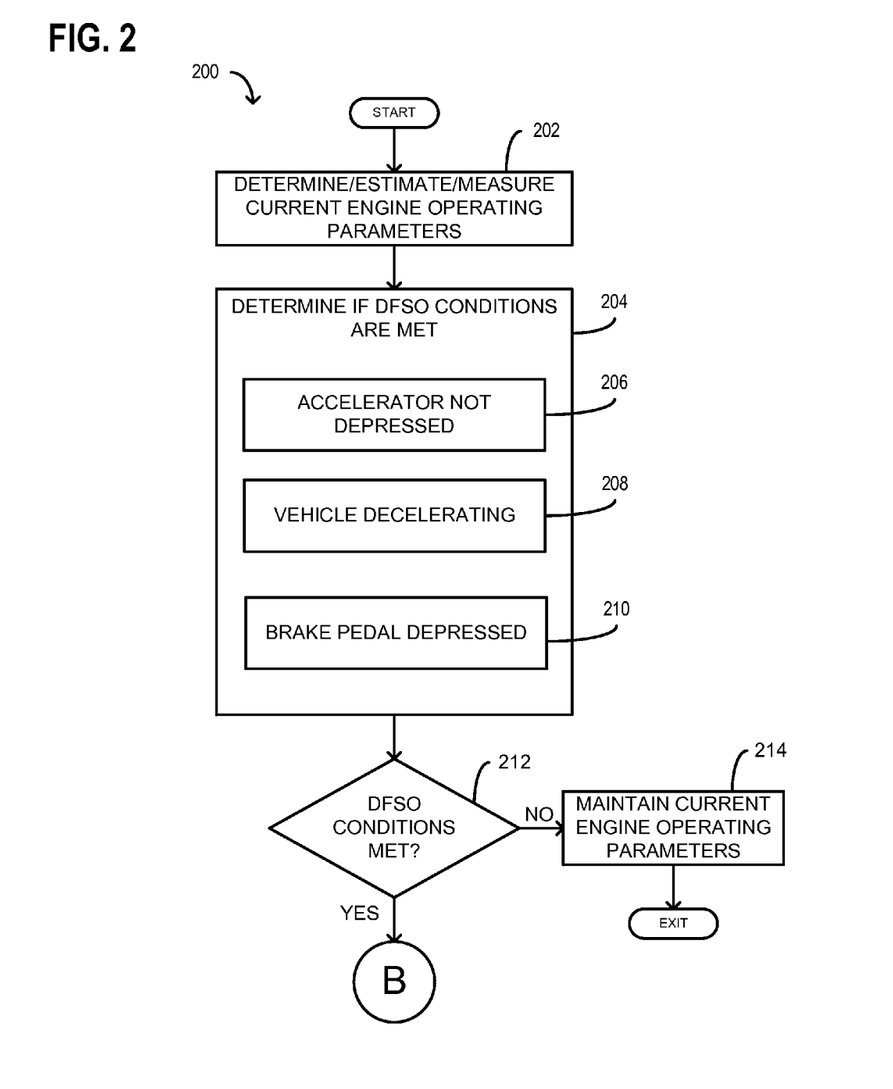
FIG. 2 shows a flow chart illustrating an example method for enacting a DFSO.

FIG. 2 illustrates an example method 200 for determining DFSO conditions in a motor vehicle in one embodiment. DFSO may be used to increase fuel economy by shutting-off fuel injection to one or more cylinders of an engine. DFSO conditions are described in further detail below.

Method 200 may begin at 202, which includes determining, estimating, and/or measuring current engine operating parameters. The current engine operating parameters may include a vehicle speed, PP, throttle position, and/or an air/fuel ratio. At 204, the method 200 includes determining DFSO conditions are met. DFSO conditions may include but is not limited to an accelerator not being depressed 206, a vehicle decelerating 208, and/or a brake pedal being depressed 210. A throttle position sensor may be used to determine the accelerator pedal position (e.g., a pedal position). A throttle position may be less open as a pedal position inclines (e.g., becomes less depressed). Additionally or alternatively, a pedal position sensor (e.g., pedal position sensor 134) may be used to determine the pedal position and send a pedal position signal (PP) to a controller (e.g., controller 12). The vehicle deceleration may be determined via a second vehicle speed sensor reading being less than a first vehicle speed sensor reading. The first vehicle speed sensor reading is measured before the second vehicle speed sensor reading (e.g., five seconds prior) with no other vehicle speed sensor readings being measured between the first vehicle speed sensor reading and the second vehicle speed sensor reading. The brake pedal being depressed may be determined via a brake pedal sensor. In some embodiments, other suitable conditions may exist for DFSO to occur.

At 212, the method 200 determines if one or more of the above listed DFSO conditions is met. If the condition(s) is met, then the method 200 may proceed to 302 of method 300, which will be described in further detail with respect to FIG. 3. If none of the conditions are met, then the method 200 may proceed to 214 maintain current engine operating parameters and not initiate DFSO. The method may exit.

In some embodiments, a GPS/navigation system may be used to predict when DFSO conditions will be met. Information used by the GPS to predict DFSO conditions being met may include but is not limited to route direction, traffic information, and/or weather information. As an example, the GPS may be able to detect traffic downstream of a driver's current path and predict one or more of the DFSO condition(s) occurring. By predicting one or more DFSO condition(s) being met, the controller may be able to plan when to initiate DFSO.

Method 200 is an example method for a controller (e.g., controller 12) to determine if a vehicle may enter DFSO. Upon meeting one or more DFSO conditions, the controller (e.g., the controller in combination with one or more additional hardware devices, such as sensors, valves, etc.) may perform method 300 of FIG. 3.

Figure 3:
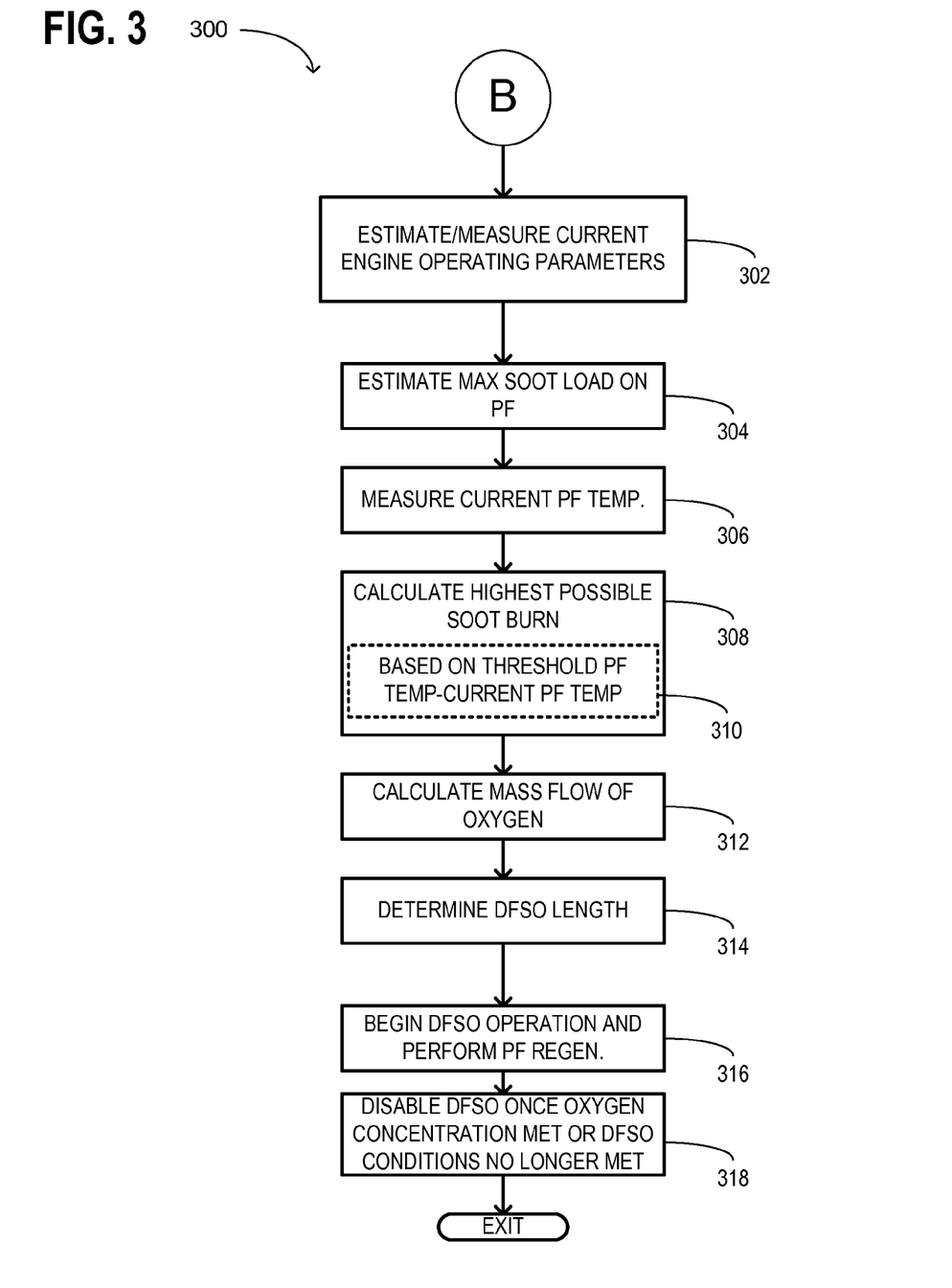
FIG. 3 shows a flow chart illustrating an example method for determining DFSO parameters and initiating DFSO.

Method 300 may be performed as part of method 200, for example in response to the one or more DFSO conditions being met, method 300 may begin to determine DFSO parameters and initiate DFSO. Method 300 may determine DFSO parameters in order to determine a length of DFSO based on a current particulate filter (PF) temperature. In this way, the method 300 may provide guidelines for a DFSO operation to regenerate a PF without reaching a temperature that may degrade the PF (e.g., an upper threshold PF temperature).

FIG. 3 illustrates an example method 300 for determining a length of DFSO based on limiting a concentration of oxygen as a function of a particulate filter temperature. The length of DFSO may be defined as an allotted time for DFSO based on a current particulate filter temperature. The mass flow of oxygen may be calculated based on a difference between an upper threshold PF temperature and a current PF temperature, wherein the difference is a temperature range that the PF may ascend. If a PF temperature were to surpass the upper threshold PF temperature, then the PF may get too hot and degrade. The degrading may include the PF developing a leak or the entire filter burning up, described in further detail below. As the flow of oxygen increases, the current PF temperature increases and the length of DFSO decreases.

During the DFSO, the system may perform a PF regeneration. The performance of PF regeneration during DFSO may depend on an exhaust gas temperature reaching a threshold exhaust gas temperature (e.g., 450° C.) and/or DFSO conditions being met. A DFSO may occur where the exhaust gas temperature does not reach the threshold exhaust gas temperature and regeneration does not occur (e.g., tip-in prior to the exhaust gas temperature reaching the threshold exhaust gas temperature). A measured exhaust gas temperature proximate to the PF may be used to estimate a PF temperature, wherein the PF temperature is substantially equal to the exhaust gas temperature measured proximate to or within the PF. Further, if a DFSO condition(s) is not met, then DFSO may be terminated prior to the PF regeneration occurring. Still further, DFSO may be terminated while the PF regeneration is occurring, wherein as the engine returns to standard operating procedures (e.g., all cylinders firing), the exhaust gas temperature may drop below the threshold exhaust gas temperature and the PF regeneration may end.

DFSO particulate filter regenerations may occur independently of passive PF regenerations, wherein a soot load on the PF is not accounted for during the DFSO particulate filter regeneration. Therefore, the method may assume a maximum soot load on the PF and perform the DFSO particulate filter regeneration during DFSO. The maximum soot load represents a PF soot load capacity, wherein the PF soot load may restrict an exhaust gas flow through the PF such that an exhaust backpressure may exceed a threshold backpressure. The threshold backpressure may be based on an exhaust backpressure measured upstream of the PF which may impede a flow of gases exhausted from an engine combustion chamber to the PF. As mentioned above, by assuming a maximum soot load on a PF, the particulate matter reaction rate is dependent on a concentration of oxygen available to the PF. Method 300 may exist as a safeguard for the PF to avoid degradation during a DFSO particulate filter regeneration.

Method 300 may be performed as part of method 200. For example, in response to the vehicle enacting DFSO, method 300 may be performed. Therefore, the present description of method 300 describes the operation of a vehicle conducting DFSO operation. At 302, the method 300 may include estimating and/or measuring current engine operating parameters. The current engine operating parameters that are estimated and/or measured may include but are not limited to vehicle speed, vehicle gear, engine load, and air/fuel ratio. At 304, the method 300 includes assuming and/or estimating a maximum soot load on the particulate filter (PF). The maximum soot load may represent a PF capacity, wherein the PF can no longer capture soot.

The maximum soot load may be assumed in order to allow the method 300 to operate under the assumption that the particulate matter reaction rate (e.g., a soot removal rate) may be dependent on only a mass flow of oxygen flowing to the PF. In this way, the DFSO length may be based on an estimated maximum soot load, but is independent of a current estimated soot load. Further, by assuming the maximum soot load, a PF temperature change may be determined based on a mass of soot burned (e.g., a PF temperature increases 100° C. to burn one gram of soot). Still further, an ash accumulation affects a soot load estimation, wherein the soot load estimation may be higher than if the ash accumulation were not present. By assuming the maximum soot load on the PF, this dilemma may be sidestepped.

At 306, the method 300 includes measuring a current PF temperature. This may be conducted by a temperature sensor coupled to the PF. Further, the PF may be treated as a continuously stirred reactor where it may be assumed that the PF operates under thermal equilibrium conditions (e.g., no heat transfer between the PF and other systems) and a volume of exhaust gas in the PF is equal to the volume of the PF. Under these assumptions, the PF temperature may be equal to an exhaust gas temperature within the PF or downstream of the PF (e.g., gas flowing out the PF). As a result, a temperature sensor may also be placed downstream of the PF in order to determine the current PF temperature. If the current PF temperature is greater than or equal to a PF regeneration temperature (e.g., 450° C.), then a PF regeneration may be initiated via a flow of oxygen. This may be based on the soot load on the PF being activated and/or hot enough to combust in the presence of oxygen.

At 308, the method 300 includes calculating the highest possible soot burn based on a difference 310 between an upper threshold PF temperature and a current PF temperature. The highest possible soot burn may be based on a difference between the estimated or measured temperature upstream of the PF and a modeled exothermic reaction across the PF, where the exothermic reaction is estimated from O2 flow. The upper threshold PF temperature may be based on a temperature where the PF may be degraded. The difference between the upper threshold PF temperature and the current PF temperature may be used to calculate the highest possible soot burn during the DFSO PF regeneration.

As an example, if a current PF temperature is 450° C. and an upper threshold PF temperature is 1050° C., then a difference between the two is 600° C. As mentioned above, a PF temperature may increase 100° C. per gram of soot burned (e.g., soot burned off the PF during regeneration). Therefore, for a difference of 600° C., the DFSO particulate filter regeneration may burn up to six grams of soot before terminating DFSO. Further, the regeneration may burn less than six grams of soot if the particulate filter regeneration is interrupted via DFSO termination (e.g., DFSO conditions are no longer met).

It will be appreciated that a current PF temperature below a threshold regeneration temperature may result in no soot being burned off due to the relationship between soot burn and temperature (e.g., the particulate filter is configured such that soot burns at temperatures above the threshold regeneration temperature (e.g., 450° C.)). Therefore, DFSO may occur without performing the PF regeneration (e.g., when a current PF temperature is 350° C. and/or any other temperature below the threshold regeneration temperature).

At 312, the method 300 includes calculating a concentration of air. The calculated concentration of air may be based on the mass of the highest possible soot burn, wherein a known amount of air is used to burn one gram of soot (e.g., 10 g of air per gram of soot). A concentration of oxygen may be extrapolated from the calculated air concentration, wherein the composition of air is substantially equal to 20% oxygen. Accordingly, approximately two molecules of oxygen may burn one molecule of soot. Therefore, by tracking an amount of air added during DFSO and not exceeding the calculated concentration of air, the method 300 may maintain a PF temperature below the upper threshold PF temperature.

As an example, if the mass of the highest possible soot burn is six grams, then the calculated air concentration is equal to 60 grams, wherein a total of 60 grams of air may flow to the PF. An air flow rate (e.g., 3 g/s) may be used to determine a length of DFSO, as indicated at 314. In this example, the length of DFSO may be determined to be 20 seconds. In this way, the determined length of DFSO may be stored in order to enable the system to command termination of DFSO responsive to the vehicle being operated under DFSO for the duration of the determined length of time (e.g., 20 seconds in the above example).

In some embodiments, additionally or alternatively, an oxygen storage capacity of an emission control device (e.g., a TWC) may be included in calculating the concentration of air. Certain catalysts within the emission control device (e.g., cerium oxide) may store oxygen during lean combustion events and release oxygen at a later event. As a result, the oxygen storage capacity may be included in calculating the concentration of air. As the oxygen storage capacity increases, the concentration of air increases.

At 316, the method 300 includes beginning the DFSO and performing the particulate filter regeneration during DFSO (e.g., based on the PF temperature reaching a regeneration temperature threshold during DFSO) which may include shutting-off a fuel injection to one or more cylinders of an engine. In this way, the concentration of oxygen in the exhaust flowing to the PF increases, thereby increasing the temperature of the PF. Further, the method 300 may inject fuel to one or more cylinders of the engine in order to reduce the concentration of $O_2$ in the exhaust flowing to the PF. The injection of fuel during DFSO may be responsive to a PF temperature at or above the upper threshold PF temperature and/or a demand to reduce the concentration of oxygen.

As an example involving a four cylinder engine, if a DFSO length is calculated to be equal to 20 seconds based on a particulate filter temperature and a maximum oxygen flow rate (e.g., all four cylinders are disabled), and a particulate matter reaction rate is calculated to be 30 seconds based on engine operating parameters, then two cylinders of the engine may be activated to extend the length of DFSO to 30 seconds and allow a complete particulate filter regeneration.

At 318, the method 300 includes terminating DFSO once the threshold oxygen concentration is met and/or once the DFSO conditions are no longer met. Terminating DFSO may include injecting fuel to each cylinder of the engine (e.g., firing all the cylinders of an engine). DFSO may be terminated prior to the threshold oxygen concentration being met if a DFSO condition is violated (e.g., throttle no longer idle and/or brake no longer depressed). Additionally or alternatively, after operating under DFSO for the length of time determined at 314 based on the calculated air concentration, DFSO may be terminated. Terminating DFSO may include fueling all the cylinders of an engine. The method may exit.

As described above, in some embodiments, the threshold oxygen concentration may not be met during DFSO due to the various techniques described above for adjusting the flow of oxygen (e.g., firing one or more cylinders and adjusting the fired cylinders air/fuel ratio during DFSO). In this way, the flow of oxygen may be adjusted such that the concentration of oxygen does not exceed the threshold oxygen concentration and thereby, the PF temperature does not exceed the upper threshold PF temperature.

Performing the PF regeneration during DFSO provides a vehicle with a method of regenerating the PF without actively increasing the exhaust temperature and activating regeneration. The method described above with respect to FIG. 3 performs DFSO particulate filter regeneration under the assumption that the PF is at a maximum soot load. Therefore, an exhaust pressure directly upstream of the filter may not be measured in order to determine a PF soot load being too high (e.g., a soot load greater than a threshold soot load) for method 300. FIG. 4 describes a diagnostic method 400 to identify proper PF regeneration incidence. Further, the method may able to determine if a PF is leaking. Additionally or alternatively, the method may diagnose an ash load accumulating to a level greater than a threshold ash load.

The method 400 functions by measuring an exhaust pressure subsequent to a DFSO particulate filter regeneration. Regardless of the DFSO particulate filter regeneration completing, the exhaust pressure may be measured. The measured exhaust pressure may be counted if the measured exhaust pressure is greater than a threshold backpressure. In this way, if a predetermined number of exhaust pressure samples exceeds a threshold sample count, then an ash load may be greater than a threshold ash load. Method 400 may be performed as part of method 300, for example, in response to DFSO termination (e.g., completion and/or interruption of the PF regeneration), method 400 may begin.

At 402, the method 400 may include estimating and/or measuring current engine operating parameters. The operating parameters that are estimated and/or measured may include one or more of an engine speed, an engine load, and an air/fuel ratio. These parameters may be used to determine if a DFSO has terminated recently. At 404, the method includes measuring an exhaust pressure upstream of the PF following a DFSO particulate filter regeneration. The exhaust pressure may be measured following a DFSO particulate filter regeneration to determine if the PF regeneration is occurring, described in further detail below. Additionally or alternatively, the measured exhaust pressure following the DFSO particulate filter regeneration may be used to determine an ash load and or a degraded PF. As ash load may accumulate as soot is burned off the PF. For example, o At 406, the method 400 compares the measured exhaust pressure to a threshold backpressure. The threshold backpressure may be based on a value and/or amount of exhaust backpressure that may prevent a desired flow rate of exhaust gas through the PF. If the measured exhaust pressure is less than the threshold backpressure, then the method 400 resets a counter 407. The measured exhaust pressure being less than the threshold backpressure indicates both an ash load being less than a threshold ash load and a soot load being less than a threshold soot load.

As an example, if three exhaust pressure measurements are measured consecutively and are greater than the threshold pressure, then the method may include increasing an increment counter by a factor of three. If a fourth exhaust pressure measurement is less than the threshold pressure, then such a measurement is indicative of a soot load on the PF reducing and exhaust flow through the PF reaching a desired flow rate (e.g., reduction in backpressure). However, if for example, 20 consecutive exhaust pressure measurements are greater than a threshold count, described in further detail below, then an ash load may be greater than the threshold ash load or a soot load may be greater than the threshold soot load, causing an increased backpressure. The soot load may be greater than the threshold soot load if the particulate filter regenerations are not occurring properly.

As an example, the particulate filter regeneration may not properly occur if an exhaust gas temperature is too low, a temperature sensor measuring a PF temperature is degraded, or a regeneration assist does not generate enough temperature increase (e.g., not enough oxygen flows to initiate regeneration). For example, if the temperature sensor is degraded, the temperature sensor may inaccurately measure a PF temperature as being higher than an actual PF temperature, then a calculated DFSO length may be decreased, resulting in less oxygen being directed toward the PF, resulting in less particulate matter (soot) burn. Additionally or alternatively, measuring a PF temperature being greater than the actual PF temperature may reduce an amount of regeneration assist provided and as a result, the PF temperature may not reach the threshold PF temperature. The ash load may exceed the threshold ash load after a successive number of regenerations (e.g., 200 PF regenerations). As a result, the method allows determination of proper regeneration during DFSO and/or detection of an ash load being greater than the threshold ash load. In this way, the increment counter may be used to track exhaust pressure measurement trends. Additionally or alternatively, the increment counter may be used to track consecutive exhaust pressure measurements exceeding the threshold pressure following the DFSO PF regeneration.

At 408, the method 400 includes comparing the measured exhaust pressure to a lower threshold exhaust pressure. The lower threshold exhaust pressure may be based on an exhaust pressure correlated to a degraded PF (e.g., leaking or missing). The PF may develop a leak or go missing if the PF regeneration gets too hot and begins to burn the filter along with the soot. A missing PF may be defined as a PF that has completely burned up and the entire PF is no longer present. Therefore, a leaking PF may be defined as a PF that has partially burned up, in which a portion of the PF burns and is missing, but remaining portions of the PF are still present. The lower threshold exhaust pressure may be a lower pressure than the threshold backpressure. If the measured exhaust pressure is greater than the lower threshold exhaust pressure, then the method 400 proceeds to 410 maintain current engine operating parameters. If the exhaust pressure is within a desired range (e.g., greater than the lower threshold exhaust pressure and less than the threshold backpressure) then the PF soot load may be below a threshold soot load, the ash load may be below a threshold ash load, and the PF may not be degraded.

Returning to 408, if the measured exhaust pressure is less than the lower threshold exhaust pressure, then the method 400 proceeds to 412 and determines that the PF may be degraded. Degradation of the PF may include the PF reaching too high a PF temperature (e.g., 1100° C.) and burning (e.g., filter develops a hole/leak or the entire filter burns (missing)). At 414, the method 400 activates an indicator lamp to notify a vehicle operator of a system degradation/malfunction. The method 400 may exit.

Returning to 406, if the measured exhaust pressure is greater than the threshold pressure, then the exhaust backpressure is higher than a desired pressure and the method 416 increases the increment counter. The increment counter may be increased only for consecutive exhaust pressure measurements greater than the threshold pressure. In this way, an increasing ash load may be monitored alongside determining proper DFSO particulate filter regeneration. At 418, the method 400 includes comparing the increment counter to a threshold count. The threshold count may be based on a predetermined number of consecutive exhaust pressure measurements to indicate an ash load exceeding a threshold ash load or a soot load exceeding a threshold soot load (e.g., 20 consecutive exhaust pressure measurements greater than the threshold pressure). If the counter is less than the threshold count, then the method may proceed to 420 maintain current engine operating parameters and the indicator lamp is not activated. The method may exit.

If the increment counter is greater than the threshold count, then the ash load may be greater than the threshold ash load or the soot load may be greater than the threshold soot load, as indicated at 422. The method 400 may activate an indicator lamp to notify the vehicle operator of a system degradation. The method 400 may exit.

In some embodiments, the method 400 may attempt to decrease the ash load responsive to the counter being greater than the threshold count. Methods to reduce the ash load may include but are not limited to flowing a gas downstream of an exhaust manifold and upstream of the PF and injecting water into an engine cylinder and/or downstream of the exhaust manifold and upstream of the PF. Additionally or alternatively, further methods to reduce the ash load may include repeated cold starts to generate condensate, where the generated condensate may be directed toward the PF and dissolve a portion of the ash load. The dissolved ash load may flow through the PF and out a tailpipe.

Method 400 provides a diagnostic routine to supplement method 300. That is to say, method 400 may proceed following the conclusion of method 300. Method 400 allows a system to accurately diagnose a DFSO PF regeneration degradation, an ash load being greater than a threshold ash load, and a PF being degraded.

FIGS. 5-6 depict a current PF temperature effect on DFSO length and an ash load accumulation over a number of PF regenerations, respectively. Attention will now be turned to FIG. 5.

FIG. 5 illustrates plot 500 of various engine conditions during DFSO. It should be understood that the examples presented in FIG. 5 are illustrative in nature, and other outcomes are possible. For example, additionally or alternatively, a current PF temperature may be greater than a threshold exhaust temperature during the initiation of DFSO.

The graphs in FIG. 5 represent various operating parameters and resultant engine controls for performing a DFSO PF regeneration. The x-axis represents time and the y-axis represents the respective engine condition being demonstrated. On plot 500, graph 502 represents a current PF temperature, line 504 represents a threshold PF temperature, and line 505 represents an upper threshold PF temperature, graph 506 represents a DFSO length, graph 508 represents a concentration of oxygen directly upstream of the PF, and graph 510 represents a concentration of oxygen directly downstream of the PF.

Plot 500 will be described herein with reference to components and system depicted in FIG. 1, particularly, PF 72 and cylinders of an engine (e.g., cylinder 30 of engine 10). Plot 500 may be measured by a controller (e.g., controller 12) according to computer-readable media stored thereon.

Prior to T1, the PF temperature is above the threshold PF temperature (e.g., 450° C.), as shown by graph 502 and line 504. The threshold PF temperature may be based on a PF temperature high enough for a PF regeneration to occur in the presence of oxygen. DFSO is disabled, as shown by graph 506, and as a result, the concentration of oxygen is nearly zero both directly upstream and downstream of the PF, as shown by graphs 508 and 510, respectively. A PF regeneration may be disabled as a result of the oxygen concentration upstream of the PF being nearly zero, despite the PF temperature being capable of initiating regeneration. In other words, a regeneration may not occur unless both the PF temperature is above the threshold PF temperature and a flow of oxygen is provided to the PF. For a PF downstream of a TWC, an oxygen concentration downstream of the TWC and directly upstream of the PF may be nearly zero for an engine operating near stoichiometry. The concentration of oxygen may be zero downstream of the TWC and directly upstream of the PF because any excess oxygen in an exhaust gas may be consumed in the TWC for oxidation of combustion by-products.

At T1, DFSO conditions are met, which may include but are not limited to a depressed brake pedal and/or a released accelerator pedal, as described above. DFSO may be initiated via signals sent by a controller (e.g., controller 12), which may include disabling fuel injections to one or more cylinders of an engine. During DFSO, intake air is permitted to flow through the engine cylinders and as a result, a PF regeneration may occur due to both a sufficient mass flow of oxygen reaching the PF and the PF temperature being greater than the threshold PF temperature. In other words, the oxygen concentration may increase upon DFSO initiation, which may increase a likelihood for the PF regeneration to occur. The concentration of oxygen pre-PF and post-PF are both nearly zero at T1 due to a phase lag (e.g., time taken for oxygen to travel from the engine cylinders to the PF).

During DFSO, the controller may adjust the concentration of oxygen by controlling a fuel injection into one or more cylinders of the engine. As an example, fuel may be injected to one or more cylinders so that a portion of oxygen may be consumed by combustion before being exhausted to the exhaust manifold, thereby decreasing the pre-PF concentration of oxygen. Inversely, if one or more cylinders is firing during DFSO, fuel injection may be disabled to one or more of the firing cylinders to increase the concentration of air flowing to the PF. In this way, the PF temperature may be controlled via adjusting fuel injections to one or more cylinders As an example, a vehicle may disable fuel injections to all the engine cylinders upon initiation of DFSO (e.g., a four cylinder engine may disable fuel injection to all four cylinders) and as a result, the concentration of oxygen may be a maximum concentration (e.g., 21% oxygen). In response to a PF temperature approaching an upper PF temperature threshold, the controller may signal to terminate DFSO or begin fuel injection to one or more engine cylinders (e.g., firing two cylinders of a four cylinder engine may reduce a concentration of oxygen from 21% to 10.5%) to reduce the PF temperature. In this way, DFSO may operate for a greater length of time so long as DFSO conditions are met.

After T1 and prior to T2, DFSO continues, increasing the pre-PF concentration of oxygen (e.g., upstream of the PF). The post-PF concentration of oxygen remains nearly zero due to the PF consuming the oxygen for regeneration. As an example, if the PF temperature is above the threshold PF temperature, the PF may be hot enough to consume a flow of oxygen directed towards the PF, thereby increasing the PF temperature. The PF temperature approaches the upper threshold PF temperature (e.g., 1100° C.). The upper threshold PF temperature may be based on a PF temperature that may degrade the PF, as described above. As discussed above, the length of DFSO may be proportional to a current PF temperature, wherein as the current PF temperature increases, the length of DFSO decreases. A controller may signal one or more cylinders of the engine to fire in order to decrease an oxygen concentration/mass flow and prolong the length of DFSO. However, in the depicted example, the pre-PF concentration of oxygen remains near 20% (e.g., all cylinders are disabled). At T2, the PF temperature reaches the upper threshold PF temperature and DFSO is disabled. As a result, the controller may signal for all of the cylinders of the engine to fire. The pre-PF concentration of oxygen remains near 20% due to a delay between signaling for the cylinders to fire and the cylinders exhausting an exhaust gas.

In some examples, the DFSO may be disabled prior to the PF temperature reaching the upper threshold PF temperature due to DFSO conditions not being met, resulting in less particulate matter being regenerated (e.g., burned) off the PF.

After T2 and prior to T3, the PF temperature and the pre-PF concentration of oxygen begin to decrease. The PF temperature decreases to a PF temperature below the threshold PF temperature, and as a result, the PF regeneration may not occur regardless of the mass flow of oxygen directed toward the PF. Additionally or alternatively, the exhaust backpressure may increase while the PF temperature is below the threshold PF temperature as the PF captures soot (e.g., particulate matter) along with being unable to regenerate due to an inadequate flow of oxygen to the PF. The post-PF concentration of oxygen remains near zero percent. For an engine operating near stoichiometry, nearly all of the oxygen delivered to the cylinder is consumed during the combustion process, resulting in a minimal amount of oxygen being exhausted from the cylinder. At T3, DFSO conditions are met, as described above, and DFSO is initiated. As a result, the pre-PF concentration of oxygen increases after a duration of time equal to a time allocated for oxygen to travel from the engine cylinders to the PF. However, due to the PF temperature being below the threshold PF temperature (e.g., 450° C.), the PF regeneration does not occur. In this way, a DFSO may occur without a PF regeneration occurring. Additionally or alternatively, as a result of the PF temperature being below the threshold PF temperature, the mass flow of oxygen may travel through the PF without being consumed and as a result, the post-PF concentration of oxygen may be substantially equal to the pre-PF concentration of oxygen.

After T3 and prior to T4, the DFSO continues and both the pre-PF concentration of oxygen and the post-PF concentration of oxygen begin to increase and reach 20%. The PF temperature remains below the threshold PF temperature. At T4, and the DFSO conditions may no longer be met (e.g., tip-in and/or brake pedal no longer actuated) and the DFSO is disabled. As a result, one or more cylinders of the engine may begin to fire. After T4, the DFSO remains disabled and the PF temperature remains below the threshold PF temperature. The pre-PF concentration of oxygen and the post-PF concentration of oxygen begin to decrease to zero due to the engine operating at or near stoichiometry.

FIG. 5 represents examples of two different operations of DFSO. One DFSO operation was initiated concurrent to a PF temperature being above a threshold PF temperature, and as a result, a PF regeneration occurred during an entirety of the DFSO. The DFSO was disabled as the PF temperature reached an upper threshold PF temperature in order to prevent PF degradation. A second DFSO operation was initiated while a PF temperature was below the threshold PF temperature and as a result, the PF regeneration did not occur during the DFSO. As a result, the DFSO was disabled due to DFSO conditions no longer being met. FIG. 6 represents a graphical example of a vehicle accumulating ash after performing multiple PF regenerations.

FIG. 6 illustrates plot 600 of various engine conditions. It should be understood that the examples presented in FIG. 6 are illustrative in nature, and other outcomes are possible. For example, additionally or alternatively, a PF regeneration may not occur during each instance of an exhaust temperature being greater than or equal to a threshold exhaust temperature.

The graphs in FIG. 6 represent various operating parameters and resultant engine controls for diagnosing proper PF regeneration. The x-axis represents time and the y-axis represents the respective engine condition being demonstrated. On plot 600, graph 602 represents a soot load, graph 604 represents an exhaust temperature and line 605 represents a threshold exhaust gas temperature, graph 606 represents an exhaust backpressure and line 608 represents a threshold exhaust backpressure, graph 610 represents an ash load and line 612 represents a threshold ash load, and graph 614 represents if a regeneration is occurring.

The exhaust backpressure may be based on an exhaust flow restriction caused by one or more of a soot load exceeding a threshold soot load and an ash load exceeding a threshold ash load. An increase in the exhaust flow restriction may also increase the exhaust backpressure.

Plot 600 will be described herein with reference to components and system depicted in FIG. 1, particularly, PF 72, pressure sensor 73, and cylinder(s) 30 of an engine 10. Plot 600 may be measured by a controller (e.g., controller 12) according to computer-readable media stored thereon.

Prior to T1, a soot load and exhaust backpressure are relatively high, respectively shown by graphs 602 and 606. As the exhaust backpressure is determined to be greater than the exhaust backpressure threshold, as shown by line 608, then the controller may signal to activate regeneration assist to increase the exhaust temperature, as shown by line 604. The regeneration assist may include but is not limited to one or more of delaying a spark timing and increasing a fuel injection volume. An exhaust backpressure greater than the threshold exhaust backpressure may impede an exhaust flow from flowing through the particulate filter. As described above, the exhaust temperature may be substantially equal to a particulate filter temperature, therefore the threshold exhaust temperature (line 605) may be substantially equal to a threshold particulate filter temperature. The threshold particulate filter temperature may be based on a particulate filter temperature capable of igniting a regeneration in the presence of excess oxygen. The ash load remains relatively low and fairly constant due to no new ash being formed (e.g., soot is not being burned into ash), as shown by graph 610. The regeneration is not occurring, as shown by graph 614. At T1, the PF regeneration is initiated. This may be due to a DFSO conditions being met and consequent DFSO initiation along with the PF temperature being greater than or equal to the threshold PF temperature. As described above, DFSO conditions include one or more of a vehicle decelerating, a brake pedal being depressed, and an accelerator pedal not being actuated. The exhaust temperature reaches the threshold exhaust temperature and as a result, the PF temperature reaches the threshold PF temperature. The soot load and exhaust backpressure begin to slightly decrease. The ash load remains relatively low.

Ash may accumulate subsequent the PF regeneration. The regeneration may burn off the soot and convert at least a portion of the soot into ash. The ash may build up on the PF in a similar manner to the soot. In this way, a high ash load (e.g., an ash load greater than a threshold ash load) may restrict an exhaust flow from an engine through the PF. However, a duration of time for the ash load to increase beyond the threshold ash load may be greater than a duration of time for the soot load to increase beyond the threshold soot load (e.g., 30,000 miles of vehicle driving compared to 40 miles of vehicle driving, respectively).

After T1 and prior to T2, the regeneration continues and as a result, the soot load begins to decrease. As the soot load decreases, the ash load begins to increase relatively slowly. As described above, the ash load may increase beyond the threshold ash load after approximately 30,000 miles traveled. Therefore, the ash load may increase by a marginal amount after a single PF regeneration. As the PF regenerates and the soot load burns off the PF, the exhaust backpressure begins to decrease (e.g., an exhaust restriction created by the soot load is reduced and thus exhaust gas exhausted from the engine cylinders is able to flow through the PF). Both the soot load and the exhaust backpressure decrease to a relatively low level as the regeneration continues. The exhaust temperature continues to increase during the regeneration as the mass flow of oxygen to the PF increases due to the DFSO. As described above, the PF temperature increases 100° C. for every 10 g of air (2 g oxygen) delivered to the PF.

In some embodiments, additionally or alternatively, the mass flow of oxygen may be controlled during DFSO by firing one or more cylinders during the DFSO. The mass flow of oxygen may further be controlled by adjusting an air/fuel ratio of the one or more firing cylinders (e.g., cylinders may fire lean (lambda greater than 1) or rich (lambda less than 1)). In this way, the PF temperature may not reach an upper threshold PF temperature during the PF regeneration due to an oversupply of oxygen, resulting in a termination of DFSO only due to DFSO conditions not being met.

At T2, the DFSO is disabled (e.g., DFSO conditions are no longer met or the PF temperature reaches the upper threshold PF temperature), thereby disabling the regeneration. The exhaust temperature begins to decrease, however, still remains above the threshold exhaust temperature. The ash load remains fairly constant. The exhaust backpressure and soot load both remain relatively low.

After T2 and prior to T3, the exhaust temperature falls below the threshold exhaust temperature. The exhaust backpressure begins to increase as the soot load increases as a result of the exhaust temperature falling below the threshold exhaust temperature. The ash load remains constant as the PF regeneration remains disabled/inactive. At T3, the exhaust temperature remains below the threshold exhaust temperature. The soot load and exhaust backpressure continue to increase. The ash load remains constant.

After T3 and prior to T4, the vehicle is driven for 30,000 miles. Over this duration, a plurality of PF regenerations may occur. The PF regenerations may be either passive (e.g., no regeneration assist used to increase the exhaust temperature) or active (e.g., regeneration assist used along with DFSO). The ash load may increase over the 30,000 mile duration and eventually exceed the threshold ash load. An ash load greater than the threshold ash load may increase an exhaust backpressure to be greater than the threshold exhaust backpressure. At T4, both the soot load and the exhaust backpressure are relatively high. The exhaust backpressure is greater than the threshold exhaust backpressure (e.g., exhaust flow through the PF is impeded/restricted). The ash load is greater than the threshold ash load. Therefore, the exhaust backpressure may be greater than the threshold exhaust backpressure due to either the high soot load or the high ash load. The exhaust temperature is below the threshold exhaust temperature and as a result, the regeneration is disabled.

After T4 and prior to T5, the exhaust temperature begins to increase due to regeneration assist being initiated as a response to the sensed exhaust backpressure being greater than the threshold back pressure. The soot load remains relatively high. The ash load remains greater than the threshold ash load. The regeneration remains disabled due to the exhaust temperature not yet reaching the threshold exhaust temperature. At T5, the regeneration begins as the exhaust gas temperature reaches the threshold exhaust gas temperature and DFSO is initiated. As depicted above with respect to FIG. 5, a PF temperature (e.g., exhaust gas temperature) may be greater than or equal to the threshold PF temperature (e.g., threshold exhaust gas temperature) and not initiate a PF regeneration due to a lack of oxygen (e.g., nearly 0% oxygen flow to a PF for an engine operating at or near stoichiometry). However, in this example, the exhaust gas heats the PF to the threshold PF temperature and DFSO begins to initiate the regeneration. The soot load begins to decrease as the regeneration is initiated. The ash load begins to increase as at least a portion of the soot load is regenerated into ash. The exhaust backpressure remains greater than the threshold exhaust backpressure, despite the decrease in soot load. This may be due to the ash load being greater than the threshold ash load.

After T5 and prior to T6, the regeneration continues and the exhaust temperature continues to increase. The soot load continues to decrease and as a result, the ash load begins to increase. Consequently, the exhaust backpressure increases and remains greater than the threshold exhaust backpressure. Further, despite the regeneration reducing the soot load, the regeneration may not be able to reduce the backpressure due to the ash load being greater than the threshold ash load. The controller may activate an indicator lamp in response to the exhaust backpressure exceeding the threshold exhaust backpressure after the regeneration. At T6, the exhaust temperature begins to decrease. The exhaust backpressure remains above the threshold backpressure due to the ash load remaining above the threshold ash load. The soot load continues to decrease and remains relatively low. The regeneration is disabled due to the DFSO being terminated despite the exhaust temperature remaining above the threshold exhaust temperature. After T6, the soot load remains fairly constant and relatively low. The exhaust temperature falls below the threshold exhaust gas temperature. The regeneration remains disabled. The ash load remains above the threshold ash load, however, it does not increase due to the regeneration being disabled. The exhaust backpressure remains above the threshold exhaust back pressure.

In this way, PF regeneration during DFSO enables a vehicle to regenerate a PF when it does not meet passive regeneration conditions. By controlling a length of DFSO based on a flow of oxygen and PF temperature change, the vehicle may avoid overheating the PF. Further, the concentration of oxygen may be controlled via firing/disabling one or more cylinders of an engine. By fueling one or more cylinders of the engine, the oxygen concentration may be decreased. Further, a PF soot load does not need to be calculated and may be assumed to be a maximum soot load. By assuming a maximum soot load, a particulate matter reaction rate may be independent of a current estimated soot load and only be a function of a mass flow of oxygen provided to the PF.

The technical effect of controlling a length of DFSO is to protect a PF from receiving too much oxygen and overheating. In this way, a vehicle may safely perform a PF regeneration during DFSO. Additionally or alternatively, the length of DFSO may be extended via firing one or more cylinder of the engine during a DFSO particulate filter regeneration in order to allow a complete particulate filter regeneration. As described above, if a particulate matter reaction rate is less than the length of DFSO (e.g., time desired for complete regeneration is greater than a time calculated for the length of DFSO), then the DFSO may be extended to allow complete particulate filter regeneration.

In some engine representations, such as direct injection spark ignition engines, soot generation may occur primarily during cold start. Such soot generation profiles, coupled with driving profiles having little to no operation at sustained higher engine loads sufficient to regenerate the soot filter may be problematics. In this way, a vehicle exhaust temperature may not increase to a threshold exhaust temperature (e.g., 450° C.) in order to substantially heat the particulate filter to a threshold particulate filter temperature (e.g., 450° C. or greater). The threshold particulate filter temperature may be based on a particulate filter temperature which may perform a regeneration in the presence of oxygen, where excess oxygen again may be limited in spark ignition engines operating substantially at stoichiometry for a majority of engine operation. Additionally, the soot load may exceed a threshold soot load if a consecutive number of engine cold-starts accompanied with shortened vehicle travel (e.g., less than a threshold exceeds a threshold number without a particulate filter regeneration interjected in between (e.g., 10 engine cold-starts with minimal vehicle travel with no regenerations occurring in that span). The threshold soot load may be based on a soot load capable of restricting a flow of exhaust from an engine. In this way, an exhaust backpressure may be increased.

If the exhaust backpressure is greater than a threshold exhaust backpressure, then a controller may activate a regeneration assist. The regeneration assist may include delaying a spark timing and/or increasing a fuel injection amount as a continuation of three-way catalyst heating operation during engine cold start operation. For example, a first amount of spark retard may be used from cold start to raise three-way catalyst temperature to its light of temperature, and then said spark retarded ended when the soot load (or pressure drop across the filter) is less than a threshold. However, in another mode, the first amount of spark retard may be continued (or transitioned to a second amount of greater/lesser spark retard than the first amount) in response to (e.g., immediately after and in response to) the three-way catalyst reaching its light-off temperature to assist in regeneration of the filter. At the same time as the spark extension and/or transition, the combustion air-fuel ratio may be enleaned (e.g., leaned from a first lean a/f to a second, leaner, a/f and/or leaned from a stroichiometric a/f to a lean a/f) to provide oxygen for particulate filter regeneration. By doing this, an exhaust gas temperature may increase or be maintained above the threshold exhaust temperature, thereby increasing a particulate filter temperature to the threshold particulate filter temperature. Additionally or alternatively, the heated particulate filter may undergo a regeneration upon the controller initiating a DFSO based on DFSO conditions being met, as described herein (for example with regard to FIGS. 1-6). A particulate filter temperature greater than or equal to the threshold particulate filter temperature may be based on a temperature in which the soot is hot enough to combustion in the presence of oxygen. The DFSO conditions may include one or more of a brake pedal being depressed, a vehicle decelerating, and an accelerator pedal not being depressed. If the DFSO is initiated, one or more cylinders of an engine may be disabled (e.g., fuel is no longer injected to disabled cylinders). In this way, oxygen may flow through the disabled cylinders without being consumed by a cylinder combustion. The oxygen may then flow to the particulate filter with a particulate filter temperature above the threshold particulate filter temperature, where the oxygen may be consumed during a particulate filter regeneration.

The particulate filter temperature may increase during the particulate filter regeneration as a function of a mass flow of oxygen provided to the particulate filter. The particulate filter temperature change during the regeneration may be calculated via assuming a maximum soot load on a particulate filter and by measuring the mass flow of oxygen delivered to the particulate filter. By assuming the maximum soot load, the temperature change may be based on the mass flow of oxygen, even if the assumed maximum soot load is widely inaccurate.

If the particulate filter temperature increases beyond an upper threshold particulate filter temperature then the particulate filter may become degraded (e.g., develop a leak or completely burn up). In order to mitigate a likelihood of particulate filter degradation, the mass flow of oxygen may be controlled during the DFSO by adjusting an operation of one or more cylinders. For example, if the particulate filter temperature is nearing the upper threshold particulate filter temperature, a controller may signal for one or more cylinders of the engine to fire during DFSO. In this way, the mass flow of oxygen to the particulate filter is decreased corresponding to a number of cylinders fired. Additionally or alternatively, the cylinders fired during DFSO may operate under lean (e.g., lambda greater than 1) or rich (e.g., lambda less than 1) in order to further control the mass flow of oxygen. In this way, a concentration of oxygen delivered to the particulate filter may be in the range of 21% (e.g., ambient air, no cylinders firing) to 0% (e.g., all cylinders operating at stoichiometry, DFSO disabled). In this way, the particulate filter temperature may not reach the upper threshold particulate filter temperature as a cause of oversupply of oxygen. In such cases, the total number of cylinders deactivated versus fired, as well as the mass flow of gas to the exhaust, may be adjusted in response to a duration of the DFSO event under the assumption that the filter begins the regeneration maximally loaded with soot to its determined capacity.

A method for an engine, comprising adjusting a length of a deceleration fuel shut-off (DFSO) event and a total number of activated and deactivated cylinders during the DFSO based on an estimate for a particulate filter temperature change during a particulate filter regeneration. The particulate filter regeneration during DFSO, additionally or alternatively, further includes disabling one or more cylinders of the engine, and firing the remaining cylinders of the engine to control an oxygen concentration and flow, and wherein the particulate filter regeneration occurs during the DFSO, and wherein temperature change is an estimated temperature increase that occurs during the DFSO and the regeneration during the DFSO. The disabling includes shutting-off a fuel supply to the cylinders of the engine, the firing includes flowing the fuel supply to the remaining cylinders of the engine.

The method, additionally or alternatively, further includes adjusting the length based on an estimate for the particulate filter temperature change during particulate filter regeneration occurring during the DFSO event. The particulate filter temperature change is based on a difference between a threshold particulate filter temperature and a current particulate filter temperature. The method, additionally or alternatively, further includes calculating an estimated mass of soot burned based on the difference between the threshold particulate filter temperature and the current particulate filter temperature. The method further comprising calculating an oxygen concentration based on oxygen measured by a UEGO sensor at the engine outlet and a model for oxygen storage over a catalyst upstream of the particulate filter. The method, additionally or alternatively, wherein adjusting the length of the DFSO further comprises decreasing the length of the DFSO as the oxygen concentration increases.

A system, comprising an engine with a plurality of cylinders, an exhaust pathway coupling the engine to a particulate filter, and a controller having computer readable instructions stored on non-transitory memory for initiating a DFSO during a vehicle deceleration event via shutting-off a fuel supply to the cylinders of the engine and firing one or more cylinders of the engine during a DFSO to control an oxygen concentration. The DFSO is terminated upon a tip-in. Additionally or alternatively, the oxygen concentration decreases as the number of fired cylinders increases.

The system, additionally or alternatively, further includes activating regeneration assist at an engine cold-start in response to an exhaust backpressure being greater than a threshold exhaust backpressure.

A method, comprising responsive to a deceleration, initiating a DFSO, performing a particulate filter regeneration, and terminating the DFSO to end the particulate filter regeneration. The DFSO includes shutting-off a fuel supply to at least one cylinder of an engine. The terminating the DFSO, additionally or alternatively, further includes flowing a fuel supply to all engine cylinders. Terminating the DFSO, additionally or alternatively, further includes being responsive to one or more of a tip-in and an oxygen concentration of an exhaust flow to the particulate filter being greater than a calculated concentration of oxygen.

The method, additionally or alternatively, further includes the oxygen concentration of the exhaust flow to the particulate filter is decreased by firing one or more cylinders of an engine during the DFSO. Additionally or alternatively, the method further includes a GPS device, the GPS device is able to predict instance of permissible DFSO operation based on at least traffic information. The DFSO, additionally or alternatively, is performed for a length of time based on a current particulate filter temperature, wherein the length of time increases as the current particulate filter temperature decreases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    adjusting a length of a deceleration fuel shut-off (DFSO) event and a total number of activated and deactivated cylinders during the DFSO based on an estimate for a particulate filter temperature change during a particulate filter regeneration.

2. The method of claim 1, wherein the particulate filter regeneration during the DFSO further includes disabling one or more cylinders of an engine, and firing the remaining cylinders of the engine to control an oxygen concentration and flow, and wherein the particulate filter regeneration occurs during the DFSO, and wherein temperature change is an estimated temperature increase that occurs during the DFSO and the regeneration during the DFSO.

3. The method of claim 2, wherein the disabling includes shutting-off a fuel supply to the cylinders of the engine, the firing includes flowing the fuel supply to the remaining cylinders of the engine.

4. The method of claim 1, wherein adjusting the length includes adjusting the length based on an estimate for the particulate filter temperature change during particulate filter regeneration occurring during the DFSO event.

5. The method of claim 1, wherein the particulate filter temperature change is based on a difference between a threshold particulate filter temperature and a current particulate filter temperature.

6. The method of claim 5, further comprising calculating an estimated mass of soot burned based on the difference between the threshold particulate filter temperature and the current particulate filter temperature.

7. The method of claim 6, further comprising calculating an oxygen concentration based on oxygen measured by a UEGO sensor at the engine outlet and a model for oxygen storage over a catalyst upstream of the particulate filter.

8. The method of claim 7, wherein the adjusting the length of the DFSO further comprises decreasing the length of the DFSO as the oxygen concentration increases.

9. A system, comprising;
    an engine with a plurality of cylinders;
    an exhaust pathway coupling the engine to a particulate filter; and
    a controller having computer readable instructions stored on non-transitory memory for:
        initiating a DFSO during a vehicle deceleration event via shutting-off a fuel supply to the cylinders of the engine; and
        firing one or more cylinders of the engine during a DFSO to control an oxygen concentration.

10. The system of claim 9, wherein the DFSO is terminated upon a tip-in.

11. The system of claim 9, wherein the oxygen concentration decreases as the number of fired cylinders increases.

12. The system of claim 9, further comprising activating regeneration assist at an engine cold-start in response to an exhaust backpressure being greater than a threshold exhaust backpressure.

13. A method, comprising:
    responsive to a deceleration, initiating a DFSO and performing a particulate filter regeneration; and
    terminating the DFSO to end the particulate filter regeneration.

14. The method of claim 13, wherein the DFSO includes shutting-off a fuel supply to at least one cylinder of an engine.

15. The method of claim 13, wherein terminating the DFSO includes flowing a fuel supply to all engine cylinders.

16. The method of claim 15, wherein terminating the DFSO is responsive to one or more of a tip-in and an oxygen concentration of an exhaust flow to the particulate filter being greater than a calculated concentration of oxygen.

17. The method of claim 16, wherein the oxygen concentration of the exhaust flow to the particulate filter is decreased by firing one or more cylinders of an engine during the DFSO.

18. The method of claim 13, further comprising a GPS device, the GPS device is able to predict instance of permissible DFSO operation based on at least traffic information.

19. The method of claim 13, wherein the DFSO is performed for a length of time based on a current particulate filter temperature.

20. The method of claim 19, wherein the length of time increases as the current particulate filter temperature decreases.

* * * * *